Dec. 7, 1948.  J. ABIUSO  2,455,721
AIRWAY MARKER
Filed April 12, 1945  2 Sheets-Sheet 1
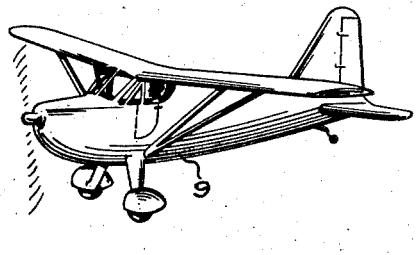
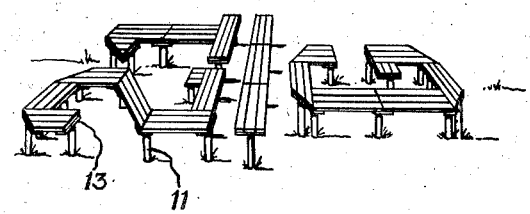
Fig. 1
Fig. 2
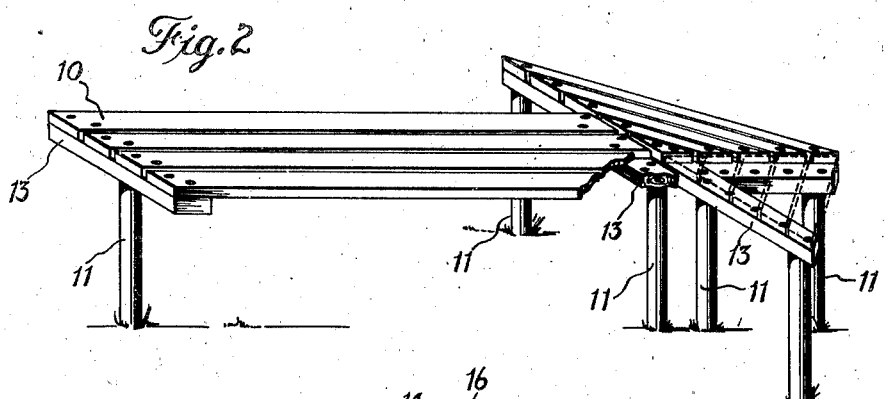
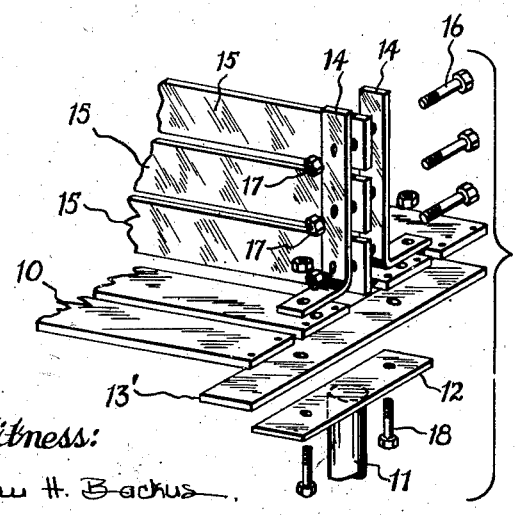
Fig. 3
Inventor
John Abiuso
by Hydell Ballard
Attorney
Witness:
Geo. H. Backus Dec. 7, 1948. J. ABIUSO 2,455,721
AIRWAY MARKER
Filed April 12, 1945 2 Sheets-Sheet 2
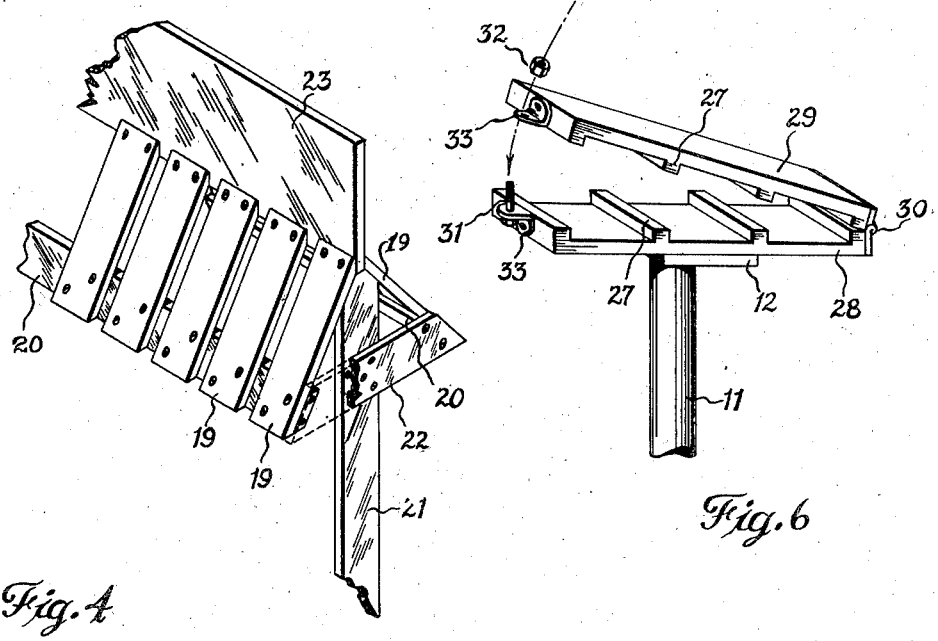
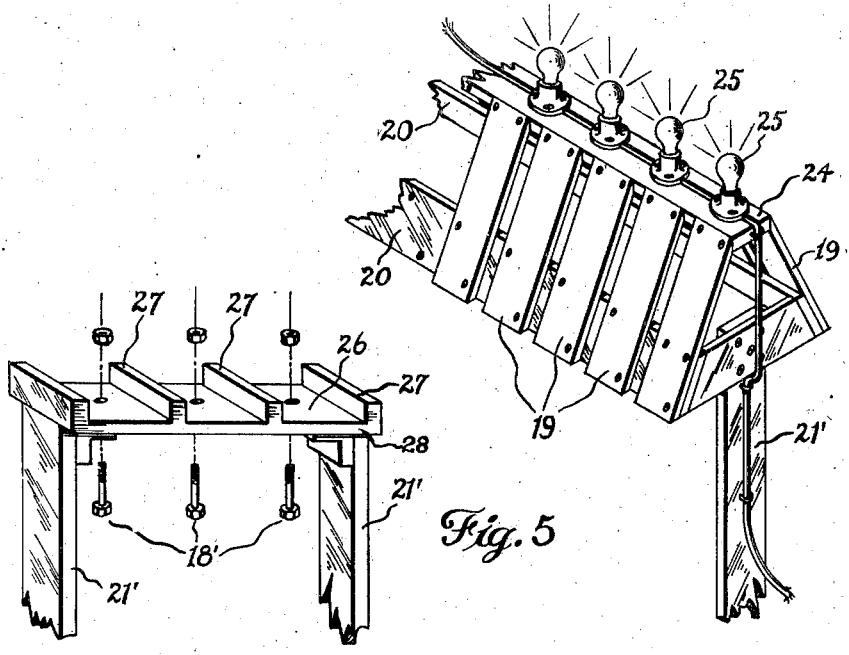
Inventor
John Abiuso
by Hyde W. Ballard
Attorney.
Witness:
Geo. H. Backus Patented Dec. 7, 1948

2,455,721

UNITED STATES PATENT OFFICE 2,455,721

AIRWAY MARKER

John Abiuso, New Cumberland, Pa.

Application April 12, 1945, Serial No. 587,974

6 Claims. (Cl. 40—125)

My invention relates to a route marker for visibly conveying information to the occupants of an aircraft.

An object of my invention is to provide a marker to be located upon the ground along air routes for indicating the direction which the pilot should take to reach a given location or which will indicate conveniently the points of the compass and any other information which may be desired.

A further object of my invention is to provide a construction for such a sign which will provide maximum visibility under all weather conditions.

A still further object of my invention is to provide a construction for an airway marker which will permit its manufacture in a central location, shipment in a knocked down condition to the desired location and assembly with a minimum of time and equipment.

Another object of my invention is to provide a system for constructing the elements of the letters so that any desired letter or symbol may be formed from a minimum of pieces and material.

Another object of my invention is to provide supporting structure for an air marker which is readily adapted to be installed in varying types of terrain.

Further objects will be apparent from the specification and drawings, in which:

Fig. 1 is a view showing my air marker installed on the ground.

Fig. 2 illustrates details of construction of a direction indicator in the shape of an arrow and constructed according to my invention.

Fig. 3 is an exploded view showing the method of assembling the joint of a marker having both a horizontal and vertical surface.

Figs. 4 and 5 illustrate modified forms of markers.

Figs. 6 and 7 illustrate various methods of supporting and fastening the slats of a marker constructed according to my invention.

While certain novel features of the invention are disclosed herein with considerable detail with respect to certain particular forms of the invention, it is not desired to be limited to such details since many changes and modifications may well be made without departure from the spirit of the invention in its broadest aspect.

Like reference numerals denote like parts in the several figures of the drawings.

Referring now more specifically to the drawings, the preferred form of my air marker is designed to provide maximum visibility to the pilot of an aircraft 9 under all weather conditions, and particularly in winter in climates where ice and snow are prevalent. The invention contemplates the use of a plurality of spaced slats or boards 10 mounted in an elevated position on posts 11. Horizontal slats 10 are secured to cross members 13 which are in turn supported by posts 11. Cross members 13 may be located at the ends of slats 10 or in any intermediate position thereby providing great flexibility in the erection of the marker. In many cases the larger as well as the smaller sections such as the arrowhead in Fig. 2 can be made up at a central location and transported ready for installation. This advantage eliminates the use of heavy boards or slabs and is of additional importance in that the sections are interchangeable for different types of signs. For example, the small triangular section of the arrowhead of Fig. 2 can be utilized to form the tip of the numeral 1 in Fig. 1.

Depending upon the particular conditions to be encountered, it may be desirable to use a horizontal combined with a vertical panel in order to obtain maximum visibility. Fig. 3 illustrates a detail of such construction. Post 11 has a top plate 12 secured thereto which in turn supports cross member 13' and slats 10. Cross member 13' also provides a support for the joints in any location where the slats abut. Angle irons 14 position vertical slats 15 by means of bolts 16 and nuts 17. Bolts 18 secure angle irons 14, slats 10, cross member 13', and plate 12 through suitably drilled holes which may, if desired, be incorporated in the various members at the place of manufacture.

Where metal tubing or pipe can be desirably utilized for posts 11, plate 12 will be welded to the top of the post before erection in the field. If wooden posts are used, cross member 13 can be nailed directly to the post as shown in Fig. 2.

The gaps between the boards or slats of the marker are important in that wind resistance is decreased thereby and also they help to keep the marker free of rain and snow. Furthermore, a considerable saving of lumber or material is achieved. An alternate form of support (described in detail hereinafter) is shown in Fig. 6 which has the advantage of requiring no nails or bolts. This type may also be desirably employed as an intermediate support between ends of the slats.

A modified type of marker using transverse instead of longitudinal slats is illustrated in Figs. 4 and 5. In this form the spaced slats 19 are placed both transversely and slantingly with respect to the longitudinal cross member 20. In this form the post 21 may support the triangular shaped raised letter directly as illustrated in Fig. 4 or a post 21' of the form shown in Fig. 3 may also be employed.

Transverse cross piece 22 secured to cross member 20 provides lateral stability. Increased visibility may be obtained by the use of a vertical member 23 at the apex of slats 19 to which the upper ends of slats 19 may be conveniently nailed or bolted. If desired, the supporting member at the top of the letter may be another longitudinal cross member such as 24 (Fig. 5) to which suitable illuminating devices 25 may be secured. Where additional stability is required, double supports or posts 21' (Fig. 7) may be employed to support a modified cross piece 26 having integral spacing elements 27 and nuts and bolts 18' for securely clamping the slats.

It will be understood that slats may be readily constructed to extend lengthwise of the supporting framework instead of crosswise as shown in Figs. 4 and 5 and the converse is true with respect to the form of Figs. 1 and 2.

The form of slat support shown in Fig. 6 lends itself readily to locations in which all of the required posts cannot be set in a predetermined position. This form provides adequate support for the slats and does not need to be drilled or bolted to the slats. It is comprised of a lower cross member 28 pivotally attached to an upper cross member 29 by hinge 30. Both the upper and lower cross members have abutting spacers 27 for maintaining proper alignment and spacing of the slats. The upper and lower cross members may be securely clamped together by means of bolt 31, nut 32, and tabs 33 secured to each other.

It will be noted that the length and construction of the slats are such that they are readily adapted to the formation of any desired symbol, or design, such as shown in Fig. 2, which may be needed to enable pilots to ascertain their location with the aid of a suitable air chart or to convey any desired information such as the distance to the next airport, latitude, longitude, points of the compass, and appropriate warnings. The slats or boards are cut in standard lengths, ordinarily two, four, or six feet, as desired. These are used in sections having square ends. Sections having ends cut on the bias are made in lengths required for the particular letter, numeral, or symbol. By the use of this system, any letter which would normally have a curved portion can be readily shaped with the use of the square and biased sections.

The elevated construction of my markers enables them to be erected in places where the ordinary marker would soon be obscured or obliterated, by underbrush or floods and the lengths of the slats is designed to enable the markers to be erected and repaired on location from a minimum assortment of prefabricated pieces. This is an important feature for markers located in remote and inaccessible territory.

Having thus described my invention, I claim:

1. A ground marker for aircraft including a substantially flat, horizontal section of substantial length and width; and a substantially flat, vertical section disposed above said horizontal section and composed of a plurality of elongated slats arranged one above the other in vertically spaced relation, said vertical section being of substantial height and of a length substantially coextensive with that of said horizontal section.

2. A ground marker for aircraft including a substantially flat, horizontal section of substantial length and width composed of a plurality of elongated slats arranged in side-by-side, spaced relation and extending along the length of said section; and a substantially flat, vertical section disposed above said horizontal section and composed of a plurality of elongated slats arranged one above the other in vertically spaced relation, said vertical section being of substantial height and of a length substantially coextensive with that of said horizontal section.

3. A ground marker for aircraft including a substantially flat, horizontal section of substantial length and width; and a substantially flat, vertical section of substantial length and height disposed above said horizontal section with its lower edge above and adjacent the longitudinal center line of said horizontal section, said vertical section being composed of a plurality of elongated slats arranged one above the other in vertically spaced relation, and said vertical section being of a length substantially coextensive with that of said horizontal section.

4. A ground marker for aircraft including a substantially flat, horizontal section composed of a plurality of elongated slats arranged in side-by-side, spaced relation and extending along the length of said section; a substantially flat, vertical section disposed above said horizontal section and composed of a plurality of elongated slats arranged one above the other in vertically spaced relation and of a length substantially coextensive with that of said horizontal section; horizontal, cross members extending transversely of the length of said horizontal section and secured to the slats thereof to maintain said slats in their assembled, spaced relation; and vertical cross members extending transversely of the length of said vertical section and secured to the slats thereof and to the horizontal section to maintain the slats of the vertical section in their assembled, spaced relation and to secure said vertical section to and above said horizontal section.

5. A ground marker for aircraft including a substantially flat, horizontal section composed of a plurality of elongated slats arranged in side-by-side, spaced relation and extending along the length of said section; a substantially flat, vertical section disposed above said horizontal section and composed of a plurality of elongated slats arranged one above the other in vertically spaced relation and of a length substantially coextensive with that of said horizontal section; a horizontal cross member extending transversely of the length of said horizontal section and secured to the slats thereof to maintain said slats in their assembled, spaced relation; and a substantially L-shaped angle arm having horizontal and vertical arms, the horizontal arm of which is secured to said horizontal section, and the vertical arm of which is secured to the slats of the vertical section to maintain the slats thereof in their assembled, spaced relation and to secure said vertical section to and above said horizontal section.

6. A ground marker for aircraft as defined in claim 5, in which the horizontal cross member secured to the slats of the horizontal section is supported in elevation above the ground with the horizontal section substantially parallel to the ground by means of a vertically extending post attached to said horizontal cross member.

JOHN ABIUSO.

(References on following page)

REFERENCES CITED

The following references are of record in the file of this patent:

UNITED STATES PATENTS

| Number | Name | Date |
|---|---|---|
| D. 87,178 | Wilhem | June 14, 1932 |
| 325,011 | Price | Aug. 25, 1885 |
| 1,539,541 | Burns | May 26, 1925 |
| 1,652,996 | Azarraga | Dec. 20, 1927 |
| 1,652,594 | Hoff | Jan. 8, 1929 |
| 1,724,647 | Eberspaecher | Aug. 13, 1929 |
| 1,827,599 | Mompon | Oct. 13, 1931 |
| 1,847,739 | Wilhem | Mar. 1, 1932 |
| 1,932,206 | Estes | Oct. 24, 1933 |
| 2,062,094 | Kip | Nov. 24, 1936 |
| 2,166,571 | Register | July 18, 1939 |